United States Patent [19]

Gupta

[11] Patent Number: 5,004,762

[45] Date of Patent: * Apr. 2, 1991

[54] RADIATION CURABLE COMPOSITIONS BASED ON 4-ACETOXYSTYRENE AND 4-HYDROXYSTYRENE HOMOPOLYMERS

[75] Inventor: Balaram Gupta, North Plainfield, N.J.

[73] Assignee: Hoechst Celanese Corp., Somerville, N.J.

[*] Notice: The portion of the term of this patent subsequent to Oct. 4, 2005 has been disclaimed.

[21] Appl. No.: 441,130

[22] Filed: Nov. 22, 1989

[51] Int. Cl.$^5$ .................. C08F 261/12; C08F 261/02; C08F 112/24; C08F 120/16
[52] U.S. Cl. .................................... 522/121; 522/188; 525/298; 525/312; 526/313; 526/326
[58] Field of Search ................ 522/121, 188; 526/326, 526/313; 525/298, 312

[56] References Cited

U.S. PATENT DOCUMENTS

| | | | |
|---|---|---|---|
| 4,775,730 | 10/1988 | Gupta | 522/121 |
| 4,826,890 | 5/1989 | Gupta | 522/121 |
| 4,826,891 | 5/1989 | Gupta | 522/121 |

FOREIGN PATENT DOCUMENTS 0187044 7/1986 European Pat. Off. .

*Primary Examiner*—Marion E. McCamish
*Assistant Examiner*—Susan Berman
*Attorney, Agent, or Firm*—Lynch, Cox, Gilman & Mahan

[57] ABSTRACT

Radiation curable compositions useful as coatings for wood, metal, glass, fabric, paper, fiber and plastics are made from homopolymers of 4-acetoxystyrene or homopolymers of 4-hydroxystyrene blended with ethylenically unsaturated compounds.

6 Claims, No Drawings

RADIATION CURABLE COMPOSITIONS BASED ON 4-ACETOXYSTYRENE AND 4-HYDROXYSTYRENE HOMOPOLYMERS

BACKGROUND OF INVENTION

The field of art to which this invention pertain is radiation curable compositions.

Due to environmental concerns and the high cost of solvents, commercial interest in radiation curable compositions is constantly increasing. Legislation which restricts the amount of solvent and other pollutants that can be vented to the atmosphere is one reason for this increased interest. Other reasons are the concerns expressed by unions and individuals over the possible toxic effects of prolonged exposure to volatile organic materials and also the high cost of petroleum derived solvents. Generally, radiation curable systems are essentially 100 percent reactive systems, i.e., substantially all of the component react to produce the final product. Such systems can be cured by exposure to high energy ionizing radiation or to actinic radiation in the presence of photoinitiators.

Various types of ethylenically unsaturated compounds have been used in making radiation curable compositions. Examples of such compounds include acrylated epoxides, such as those described in U.S. Pat. Nos. 3,676,398, 3,770,602, 4,072,592 and 4,511,732. Acrylated urethanes, such as those described in U.S. Pat. No. 3,700,643 and U.S. Pat. No. 4,511,732, have also been used in radiation curable composition. Norbornene polymers, such as those described in U.S. Pat. No. 3,554,886, are examples of other types of radiation curable compositions. Radiation curable coating compositions made from copolymers of 4-acetoxystyrene are described in U.S. Pat. Nos. 4,826,890 and 4,826,891. Constant efforts are being made to find other compositions which can be used in radiation curing.

SUMMARY OF INVENTION

This invention pertains to radiation curable compositions based on homopolymers of 4-acetoxystyrene and 4-hydroxystyrene.

The radiation curable composition of this invention are made from a blend of: (A) about 30 to about 80 weight percent of a homopolymer of 4-acetoxystyrene, a homopolymer of 4-hydroxystyrene or mixture thereof (B) about 20 to about 70 weight percent of a polyethylenically unsaturated radiation polymerizable compound; and (C) about 0 to about 40 weight percent of a monoethylenically unsaturated radiation polymerizable monomer, wherein said weight percents are based on the weight of (A), (B) and (C).

The compositions of this invention are utilized as coating compositions and can be cured by high energy electrons or by ultraviolet light if a photoinitiator is added.

DESCRIPTION OF INVENTION

The 4-acetoxystyrene homopolymers useful in this invention can be made by bulk, solution, suspension, or emulsion polymerization processes using well known techniques. Examples of such polymerization processes are described in such patents as U.S. Pat. Nos. 4,678,843, 4,689,371 and 4,822,862, which are hereby incorporated by reference.

The 4-acetoxystyrene monomer which is used to make the 4-acetoxystyrene homopolymers can be made by the process described in Carson et. al., *Journal of Organic Chemistry* 23, 544-549 (1958). As described in this article, phenol is acetylated to 4-hydroxyacetophenone which is then acetylated to 4-acetoxyacetophenone. This compound is then hydrogenated to 4-acetoxyphenylmethylcarbinol, which is then dehydrated to 4-acetoxystyrene.

The 4-acetoxystyrene homopolymers can be converted to 4-hydroxystyrene homopolymers by the hydrolysis procedures described in U.S. Pat. Nos 4,678,843, 4,689,371, 4,822,862 and 4,857,601, which are hereby incorporated by reference. Partially hydrolyzed homopolymers of 4-acetoxystyrene wherein the polymers contain both acetoxy groups and hydroxyl groups can be used in this invention as well as blends of 4-acetoxystyrene homopolymers and 4-hydroxystyrene homopolymers.

The polyethylenically unsaturated radiation polymerizable compounds which are blended with the homopolymers described hereinabove are compounds which contain two or more ethylenically unsaturated groups and, preferably, two to about six ethylenic groups. The ethylenically unsaturated groups are acrylate and methacrylate groups, vinyl groups and allyl groups. Compounds which contain the acrylate or methacrylate groups are acrylic or methacrylic acid esters of polyols wherein the polyols have two or more hydroxyl groups per molecule. Examples of such compounds are the diacrylic or dimethacrylic acid esters of ethylene glycol, propylene glycol, butanediol, butenediol, hexanediol, polyoxyethylene glycols, polyoxypropylene glycols, polyoxybutylene glycols, di- and triacrylic or methacrylic acid esters of glycerine and hexanetriol, trimethylolpropane, trimethylolethane, di, tri and tetra acrylic acid or methacrylic acid esters of pentaerythritol, the di, tri, tetra, penta and hexa acrylic or methacrylic acid esters of dipentaerythritol and the like. Other polyacrylates or methacrylates are the acrylated and methacrylated epoxy compounds such as the acrylated or methacrylated glycidyl ethers of dihydric phenols, acrylated and methacrylated epoxidized vegetable oils, acrylated and methacrylated urethanes and acrylated and methacrylated polyesters.

Examples of polyvinyl and polyallyl compounds are divinylbenzene, divinyltoluene, diallylbenzene, diallyltoluene, diallyl terephthalate, diallylmaleate, diallylfumarate and the like.

Monoethylenically unsaturated radiation polymerizable monomers which can be used in this invention are the well known monomeric compounds which contain one ethylenically unsaturated group per molecule. Examples of such monomers are alkyl acrylates and methacrylates wherein the alkyl group contains from 1 to 12 carbon atoms, mono and polyalkoxyalkylacrylates and methacrylates wherein the alkoxy groups and alkyl groups contain from 1 to 4 carbon atoms and wherein the molecules contain from 1 up to 20 alkoxy groups, hydroxyalkyl acrylates and methacrylates wherein the alkyl group contains from 1 to 6 carbon atoms, vinyl aromatic compounds, vinyl halides, vinyl pyrrolidone, vinyl pyridine, vinyl carbazole and the like.

The radiation curable compositions of this invention can be cured by any of the normal actinic radiation curing methods. The radiation can be ionizing radiation (either particulate or nonparticulate) or non-ionizing agents. As a suitable source of particulate radiation, one can use any source which emits electrons or charged nuclei. Particulate radiation can be generated by electron accelerators, such as the Vander Graff accelerator, resinous transformers, linear accelerators, insulating core transformers, radioactive elements, such as cobalt 60, strontium 90, and the like. As a suitable source of nonparticulate non-ionizing radiation, any source which admits radiation in the range of from $10^{-3}$ angstroms to 2000 angstroms can be used. Suitable sources included vacuum ultra violet lamps, such as xenon or krypton arcs. As a suitable source of non-ionizing radiation, any source which admits radiation from 2000 angstroms to 4000 angstroms can be used. Suitable sources include mercury arcs, carbon arcs, tungsten filament lamps, sun lamps and lasers. All of these devices and sources are well known in the art and those skilled in radiation technology are fully aware of the manner in which radiation is generated and the precautions to be taken in its use.

When the radiation curable coating compositions are to be cured by exposure to non-ionizing radiation, e.g., ultraviolet radiation, photoinitiators may be added to the compositions. Suitable photoinitiators which are well known in the art include 2,2-diethoxy-acetophenone, 2,3 or 4-bromoacetophenone, benzaldehyde, benzoin, benzophenone, 9,10-dibromoanthracene, 4,4'-dichlorobenzophenone, 2,3-pentanedione, hydroxycyclohexyl phenyl ketone and xanthone. Such photoinitiators are generally added in amounts of from about 0.1 weight percent up to 10 weight percent based on the weight of the total curable composition and, preferably, 1 to 5 weight percent.

Photoactivators can also be used in combination with the photoinitiators. Examples of photoactivators are methylamine, tributylamine, 2-aminoethylethanolamine, cyclohexylamine, diphenylamine and tribenzylamine.

The radiation curable compositions of this invention are preferably used as coating compositions. The coatings can be applied by conventional means, including spraying, curtain coating, dip padding, roll coating and brushing procedures. The coatings can be applied to any acceptable substrate such as wood, metal, glass, fabric, paper, fiber, plastics, etc.

The compositions of this invention are made by blending the homopolymers of 4-acetoxystyrene or with the polyethylenically unsaturated compounds. In order to adjust the viscosity for proper application, monoethylenically unsaturated monomers can be added. Additional additives which can be used in the compositions include wetting agents, fillers, defoamers, dyes and pigments, the uses of which are well known in the art.

The following examples illustrate the invention in more detail. Parts and percentages unless otherwise designated are parts and percentages by weight.

EXAMPLE 1

To a suitable reactor are added and mixed 2 parts of a homopolymer of 4-acetoxystyrene, 2.7 parts of tetraethylene glycol diacrylate, 3.2 parts of 1,6-hexanediol diacrylate, 1.6 parts of glyceryl propoxy triacrylate and 2 parts of Darocure 1173, a photoiniator obtained from Merck and Company. Films are prepared by coating the resulting clear viscous liquid onto polyester sheets and onto glass plates using a one mil wire wound rod. The films are cured at a line speed of 50 feet per minute with a RPC Ultraviolet Curing Unit, Model QC-1202, Radiation Polymer Company, Plainfield, Ill. with one 300 watt per linear inch mercury vapor lamp without an infrared filter. The films exhibit excellent cure.

EXAMPLE 2

A blend is made from 1.5 parts of a homopolymer of 4-hydroxystyrene 4.0 parts of 1,6-hexanediol diacrylate, 4.0 parts of tetraethylene glycol diacrylate and 0.5 part of Darocur 1173. Using the same procedure described in Example 1, well cured films are obtained.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A radiation curable composition comprising a blend of (A) about 30 to about 80 weight percent of a homopolymer of 4-acetoxystyrene, a homopolymer of 4-hydroxystyrene, or mixtures thereof; (B) about 20 to about 70 weight percent of a polyethylenically unsaturated radiation polymerizable compound; and (C) about 0 to about 40 weight percent of a monoethylenically unsaturated radiation polymerizable monomer, wherein the weight percents are based on the total weight of (A), (B) and (C).

2. The radiation curable composition of claim 1 wherein the polyethylenically unsaturated radiation polymerizable compound contains at least two ethylenically unsaturated groups per molecule.

3. The radiation curable composition of claim 2 wherein the polyethylenically unsaturated radiation polymerizable compound contains 2 to 6 ethylenically unsaturated groups.

4. The radiation curable composition of claim 1 which contains a photoinitiator.

5. The radiation curable composition of claim 4 wherein the photoinitiator is present in the amount of about 0.1 weight percent up to about 10 weight percent based on the total weight of the composition.

6. The radiation curable composition of claim 4 wherein the photoinitiator is present in the amount of about 1 to about 5 weight percent.

* * * * *